Aug. 7, 1945.  J. A. HUTCHESON  2,381,057
OSCILLATOR CIRCUIT FOR INDUCTIVE HEATING
Filed Nov. 5, 1942
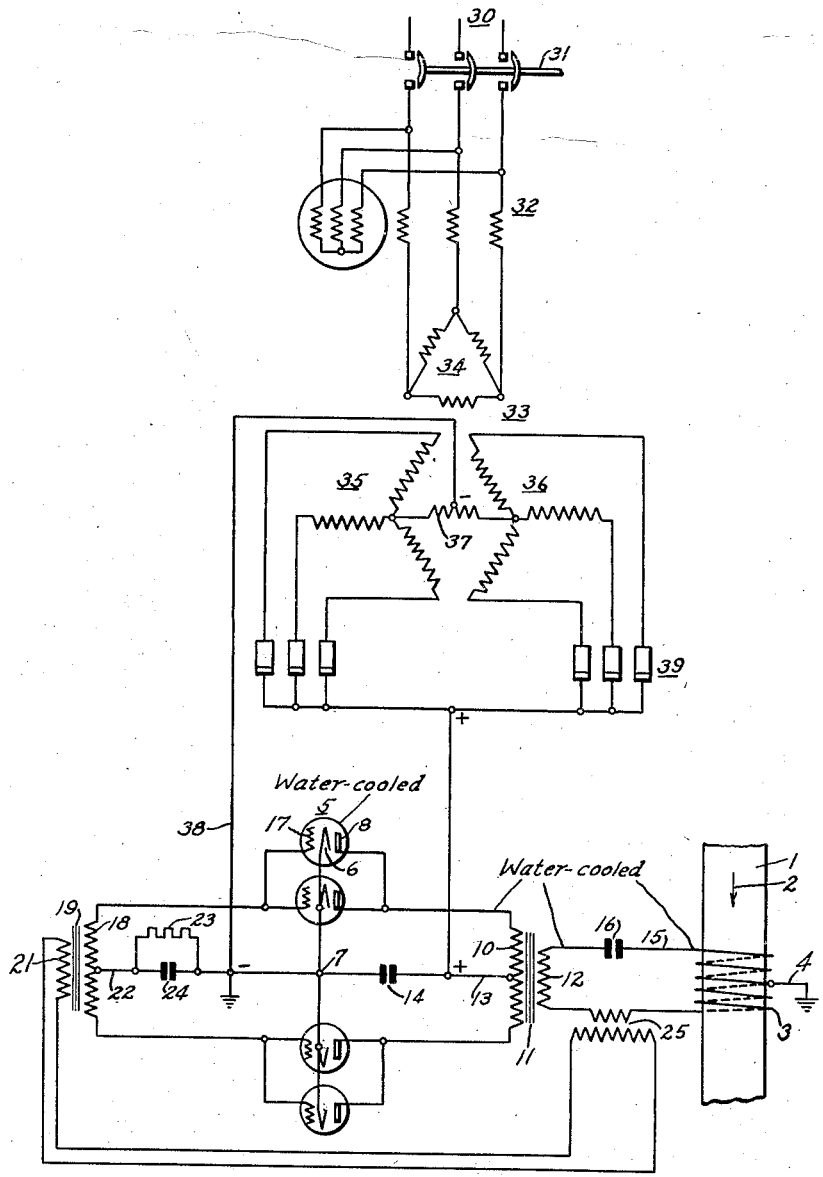
WITNESSES:
Leon M. Garman
Niv. C. Groome
INVENTOR
John A. Hutcheson.
BY O. B. Buchanan
ATTORNEY Patented Aug. 7, 1945

2,381,057

UNITED STATES PATENT OFFICE 2,381,057

OSCILLATOR CIRCUIT FOR INDUCTIVE HEATING

John A. Hutcheson, Baltimore, Md., assignor to Westinghouse Electric Corporation, East Pittsburgh, Pa., a corporation of Pennsylvania Application November 5, 1942, Serial No. 464,663

6 Claims. (Cl. 250—36)

My invention relates to an improved oscillator-tube generator-means having an inductive heating-coil effectively included in the tank circuit, so that variations in the effective inductance of the heating-coil may change the oscillation-frequency of the generator-means in response to changes in the nature or condition of the work to be heated, which is placed inside of the inductive heating-coil. More particularly, my invention relates to such an induction-heating oscillation-generator means in which an iron-core transformer is utilized to couple the output or power-delivering circuit of the oscillator-generator with the inductive heating-coil means, so as to make it possible to design the inductive heating-coil means so as to have any reactance which makes an advantageous coil-design, while, at the same time, utilizing an oscillator-tube voltage which is the most economical and efficient for the generator, and also making it possible to parallel a plurality of oscillator-tubes without the risk of any one tube hogging more than its share of the load.

My invention is particularly adapted for use in the inductive-heating apparatus which is described and claimed in an application of Glenn E. Stoltz and Robert M. Baker, Serial No. 464,040, filed October 31, 1942, and assigned to the Westinghouse Electric & Manufacturing Company. While this apparatus has other uses, it is at present most particularly applicable to the flowing or fusion of tinplate on a strip which is running at a highly variable speed, so that the rate of heat-input into the strip must be sensitively controlled so as to accommodate this wide variation in speed.

My present invention relates to improvements which have been found to be so desirable as to be practically necessary, from many respects, in generating and controlling a large amount of power. Because of the special exigencies of the use to which the oscillation-frequency power is being put, it is practically necessary to operate the oscillation-generator at an abnormally high Q, or high ratio of wattless power, which is stored in the tank-circuit, to the actual power which is delivered to the work to be heated. This is because it is necessary to be able to start up the apparatus, of course; and this starting must necessarily be done when the steel strip is cold, at which time the generator may have a Q of the order of 10, whereas, when the strip is hot, the Q may be as high as 30.

Because of the high Q of the generator, it is impossible to utilize two loosely coupled tuned circuits, with the air-coil couplings such as are commonly utilized in high-frequency circuits, because a very slight relative detuning of the two circuits, one with respect to the other, at such a high Q, will make it practically impossible to transfer any material amount of power from one circuit to the other. It is necessary, therefore, to include the inductive heating-coil in series-circuit relation as an effective part of the tank-circuit of the oscillator, which controls the oscillator-frequency, so that, when the inductance of the coil changes in accordance with the condition of the work, as in the change which is involved between initially starting the apparatus when the strip is cold, and thereafter operating the apparatus when the strip is hot, the frequency of the oscillation-generator will vary with the change in the effective reactance of the heating-coil; this frequency-change being small, but, nevertheless, important, and in fact the difference between being able to get the power into the strip and not being able to do so, in many cases.

The design of the oscillation-generator, under these conditions, and for this particular inductive-heating application, is further complicated by the practical impossibility of building an inductive heating-coil, and the necessary 40 or 100-foot transmission-line needed for connecitng it to the oscillation-generator, with a sufficiently low inductive reactance to be able to get the necessary large amount of power out of an induction-generator which is operating at the voltage which is practically required of the present known types of generators. Because of the steel-mill requirement that the heat shall be introduced into a very short length of strip—if possible, in a length approaching, within a reasonable factor of safety, that length which would produce buckling because the heat-expansion strains exceed the elastic limit or the yield point of the strip—it is extremely desirable that the inductive heating-coil or coils shall be as short, in the axial direction, as possible, up to the buckling limit just mentioned, and this still further limits the design.

In accordance with my invention, therefore, I apply, to the inductive-heating problems such as those which have been hereinabove outlined, an idea which has previously been known in radio circuits, but never before applied to a similar problem, namely the idea of utilizing an iron-core or magnetizable-core transformer for tightly coupling the output-circuit of the oscillator-tube means to the inductive heating-coil means; a tank-circuit capacitor, for determining the oscillation-frequency, being included in either the primary or the secondary of this output-transformer, the oscillation-frequency being variable with changes in the loading-condition of the inductive coil-means, and a feedback-coupling being provided for feeding power back from the inductive heating-coil, or any portion of its tank-circuit, to the input tube-controlling circuit of the oscillation-generator. In this manner, I supply variable-frequency power to an inductive heating-coil; I provide, in effect, no tuned circuits other than the single tank-circuit of which the inductive heating-coil is a part; I feed back some of the variable-frequency energy into the oscillation-generator in a manner necessary to keep it operating at a high Q; I am free to choose any necessary or desirable values of coil-voltage and coil-reactance for the inductive heating-coil means; I am likewise free to choose any desirable or practical voltage for the oscillation-generator, as may be required for successful or desirable operation, by the various limitations of the oscillator-tubes; and I am enabled to parallel as many oscillator-tubes as may be necessary, in order to increase the output of the generator to any desirable value, which may be very many times the output of the largest radio-generator for broadcasting purposes.

With the foregoing and other objects in view, my invention consists in the apparatus, combinations, systems, instrumentalities, parts, and methods hereinafter described and claimed, and illustrated in the accompanying drawing, the single figure of which is a diagrammatic view of circuits and apparatus illustrating the essential principles of a preferred application of my invention in a simple manner, omitting details which are not believed to be essential to an understanding of my invention.

In the drawing, my invention is illustrated as being applied to the heating of a rapidly moving tinplated strip 1, which is shown in the lower right-hand part of the drawing, this strip moving, or being movable, downwardly as indicated by the arrow 2, through an inductive heating-coil 3. The coil 3 is disposed in a single layer about the strip or work 1, and its midpoint may be grounded, as indicated at 4, in order to reduce the maximum voltage-difference between the terminal of the coil and the tinned strip 1. High-frequency power is supplied to the inductive heating-coil 3 by means of a high-power oscillation-generator which comprises one or more oscillator-tubes 5, preferably an even number of tubes, arranged in the familiar push-pull arrangement, as shown. While my invention, in its broadest aspects, is not limited to any particular frequency-range, an important range of frequencies, for many applications, including the tinplate reflowing application, is between 20 kilocycels and 500 kilocycles per second.

The cathodes 6 of the various oscillator-tubes 5 are connected together in a cathode-circuit 7 which is connected to the negative termial (—) of a high-voltage unidirectional-current source of supply which will be subsequently described. The plates 8 of oscillator-tubes are connected, in a push-pull circuit, to opposite terminals of the primary winding 10 of an iron-core output-transformer 11, which is also provided with a secondary-winding 12. The transformer is preferably provided with a magnetizable core which is made up of very thin laminations of a good transformer steel. Its primary and secondary windings 10 and 12 may be either separate windings, as in a two-winding transformer, or merely different winding-portions, as in an autotransformer, and I shall utilize the expression "winding-portions" as embracing either type of transformer. The midpoint of the primary winding-portion 10 is connected at 13, to the positive terminal (+) of the unidirectional-current power-supply for the oscillation-generator, the power-supply apparatus being bypassed, as to high-frequency currents, by a bypassing-capacitor 14 which is connected between the midtap 13 and the cathode-circuit 7.

The inductive heating-coil 3 is connected across the terminals of the secondary winding-portion 12 in a secondary-circuit 15 which is thus tightly coupled to the plate-circuit or output of the oscillator-tubes 5, by means of the iron-core transformer 11. A tank-circuit capacitor 16 is serially included in circuit with one of the winding-portions 10 or 12 of the iron-core output-transformer 11, being illustrated in the secondary-circuit 15.

The oscillator-tubes 5 are provided with grids 17, or other control-circuit means, for controlling the respective tubes, and these grids are shown as being connected, in push-pull fashion, to the terminals of the secondary winding 18 of a feedback-transformer 19, which is shown as also being an iron-core transformer, and which is provided with a primary winding 21. The midpoint 22 of the feedback-transformer secondary winding 18 is connected to the cathode-circuit 7 through any suitable grid-biasing means, such as a grid-resistor 23, which is bypassed by a radio-frequency bypassing-capacitor 24.

Feedback-energy is fed back to the primary winding 21 of the feedback-transformer 19, from the inductive heating-coil 3 or from any portion of its tank-circuit, as by means of a feedback-transformer 25 which is connected in the secondary circuit 15 of the output-transformer 11.

In most or many applications of my invention, it will be necessary to use water-cooled conductors, transmission-lines, and coils, for the circuits carrying the high-frequency current, as well as water-cooled oscillator-tubes 5, as indicated by the legend on the drawing.

As a result of the foregoing construction, it will be observed that the output-circuit or plate-circuit of the oscillator-tubes 5 is tightly coupled to the inductive heating-coil 3, practically as if the latter were conductively connected in series with the plate-circuit, with the important practical difference that the voltage of the coil 3 is considerably different (usually lower) than the voltage of the plate-circuit of the oscillator-tubes 5, which makes it possible, in a coil having the shortest possible axial length, to obtain a coil-design having practical voltage and reactance characteristics, while at the same time utilizing a high-power oscillation-generator, of the power-range hereinabove indicated, which operates at the high voltages which are a practical necessity for such generators. At the same time, the iron-core output-transformer 11, while somewhat costly to build, and thus not commonly used in ordinary radio-circuits, furnishes the tight coupling which is necessary in a generator which operates, at a high Q, with a variable-reactance heating-coil 3, the reactance of which is widely variable, as well as the Q of the generator, in accordance with unavoidable variations in the conditions of the loading device which is heated by the inductive heating-coil 3. Since feedback-power is supplied, through the feedback-transformers 25 and 19, from the variable-frequency circuit or output-circuit of the oscillation-generator to the input or grid circuit thereof, the oscillation-generator is able to maintain its oscillations during all conditions of the work-device 1 which is to be heated by the coil.

In any oscillation-generator which is utilized for inductive heating, it is practically necessary to provide some sort of voltage-control for the high-voltage unidirectional-current supply-circuit (+) and (−) which is utilized to energize the oscillation-generator. As an example of such variable-voltage unidirectional-current equipment, I have shown a three-phase supply-line 30, supplying power through a high-speed circuit-breaker 31 to an induction regulator 32, which supplies variable-voltage three-phase power to a step-up rectifier-transformer 33 which is illustrated as comprising a delta-connected primary winding 34 and two Y-connected secondary windings 35 and 36. The star points of the secondary windings 35 and 36 are joined by an interphase transformer 37, the midpoint of which is connected, at 38, to the negative supply-terminal (−) of the oscillator-tubes 5. The various phase-terminals of the secondary windings 35 and 36 of the rectifier-transformer are connected, through rectifiers 39, to the positive terminal (+) of the oscillator-tube supply-circuit, the rectifiers 39 being any suitable rectifying-means. For simplicity of showing, I have omitted the conventional safe-guard and control-means which would be utilized in connection with the circuit-breaker 31, the induction regulator 32, and the rectifiers 39, as such features may be conventional so far as my present invention is concerned.

While I have illustrated my invention in a single preferred form of embodiment, I wish it to be understood that my invention is not limited, in its broadest aspects, to this particular form of embodiment. I desire, therefore, that the appended claims shall be accorded the broadest construction consistent with their language.

I claim as my invention:

1. Oscillation-generator apparatus for energizing a variably loadable, variable-inductance work-coil, said apparatus comprising the combination, with said work-coil, of oscillator-tube means operating in the frequency-range between 20 kilocycles and 500 kilocycles per second, and having an input tube-controlling circuit and an output power-delivering circuit, a magnetizable-core output transformer having a primary winding portion and a secondary winding-portion, the primary winding-portion being serially included in the output-circuit of the oscillator-tube means, a variable high-voltage source of unidirectional-current power for the oscillator-tube means, the work-coil being energized in a secondary circuit including said secondary winding-portion, a tank-circuit capacitor serially included in circuit with one of the winding-portions of said magnetizable-core output-transformer for controlling the oscillation-frequency in a manner such that the frequency varies with the load-condition of the work-coil, and means for providing an energy-feedback from the power-output of the oscillator-tube means to the input tube-controlling circuit.

2. Oscillation-generator apparatus for energizing a variably loadable, variable-inductance work-coil, said apparatus comprising the combination, with said work-coil of oscillator-tube means operating in the frequency-range between 20 kilocycles and 500 kilocycles per second, and having an input tube-controlling circuit and an output power-delivering circuit, a magnetizable-core output-transformer having a primary winding-portion and a secondary winding-portion, the primary winding-portion being serially included in the output-circuit of the oscillator-tube means, a variable high-voltage source of unidirectional-current power for the oscillator-tube means, the work-coil being energized in a secondary circuit including said secondary winding-portion, a tank-circuit capacitor serially included in said secondary circuit for controlling the oscillation-frequency in a manner such that the frequency varies with the load-condition of the work-coil, and means for providing an energy-feedback from the power-output of the oscillator-tube means to the input tube-controlling circuit.

3. Oscillation-generator apparatus for energizing a variably loadable, variable inductance work-coil, said apparatus comprising the combination, with said work-coil of oscillator-tube means operating in the frequency-range between 20 kilocycles and 500 kilocycles per second, and having an input tube-controlling circuit and an output power-delivering circuit, a magnetizable-core output-transformer having a primary winding-portion and a secondary winding-portion, the primary winding portion being serially included in the output-circuit of the oscillator-tube means, a variable high-voltage source of unidirectional-current power for the oscillator-tube means, the work-coil being energized in a secondary circuit including said secondary winding-portion, a tank-circuit capacitor serially included in said secondary circuit for controlling the oscillation-frequency in a manner such that the frequency varies with the load-condition of the work-coil, and means for providing an energy-feedback from said secondary circuit to the input tube-controlling circuit.

4. The invention as defined in claim 1, characterized by the feed-back means including a magnetizable-core feedback-transformer.

5. The invention as defined in claim 2, characterized by the feed-back means including a magnetizable-core feedback-transformer.

6. The invention as defined in claim 3, characterized by the feed-back means including a magnetizable-core feedback-transformer.

JOHN A. HUTCHESON.